United States Patent

[11] 3,600,033

[72] Inventors Carl J. Holdampf
Southfield;
Randal T. Murphy, Royal Oak, both of, Mich.
[21] Appl. No. 874,323
[22] Filed Nov. 5, 1969
[45] Patented Aug. 17, 1971
[73] Assignee Lear Siegler, Inc.
Santa Monica, Calif.

[54] FOLD-UP SEAT
9 Claims, 4 Drawing Figs.
[52] U.S. Cl. .................................................. 297/16, 297/333
[51] Int. Cl. ................................................. A47c 4/00
[50] Field of Search .................................... 297/11, 16, 59, 42, 43, 55, 83, 311, 312, 316, 285, 232, 338, 34; 296/65, 69

[56] References Cited
UNITED STATES PATENTS
3,188,134 6/1965 Nixon ............................ 296/69
3,327,906 3/1966 Heyl, Jr. ........................ 297/307
3,376,587 4/1968 Staron ........................... 297/331

Primary Examiner—Bobby R. Gay
Assistant Examiner—Garry Moore
Attorney—Barnard, McGlynn and Reising ABSTRACT: A collapsible unison acting spring suspended seat comprising a seat having a pivotal front leg assembly, a spring biased arm resiliently supporting the back of the seat when in the occupiable condition, a backrest pivotally connected to the rear of the seat and a vertical track for permitting the backrest to displace vertically in unison with the rear of the seat. The backrest may be latched in a raised position which permits the seat to pivot into a collapsed position wherein it hangs beneath the backrest and between the backrest and the floor.

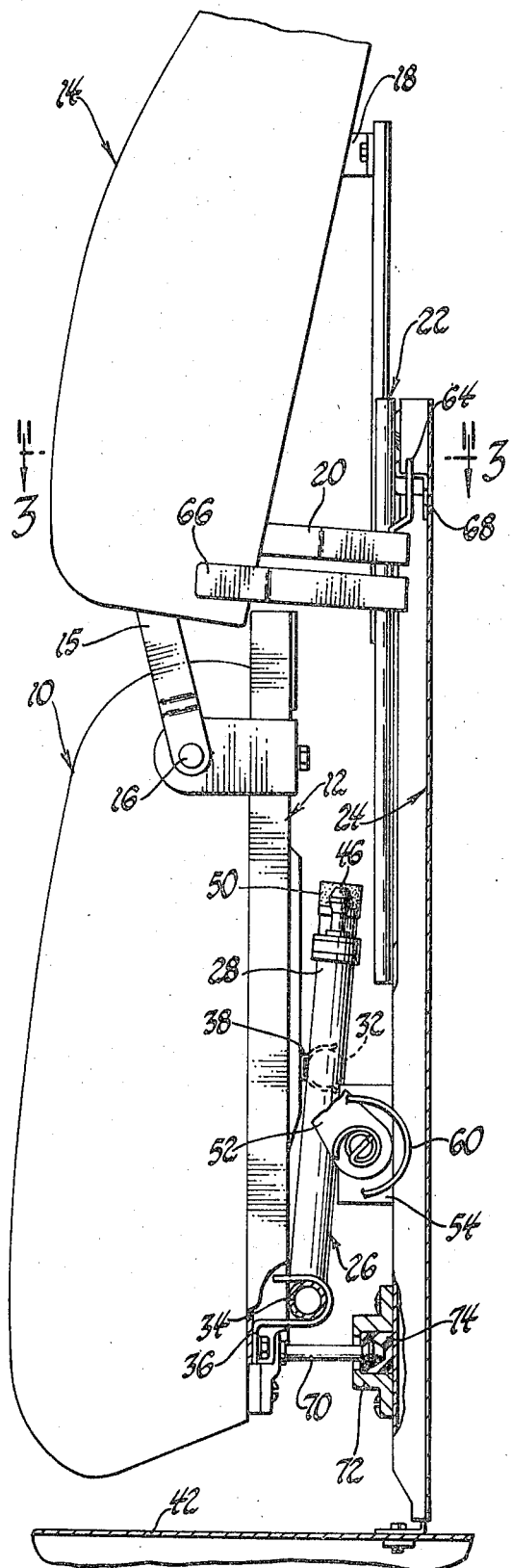
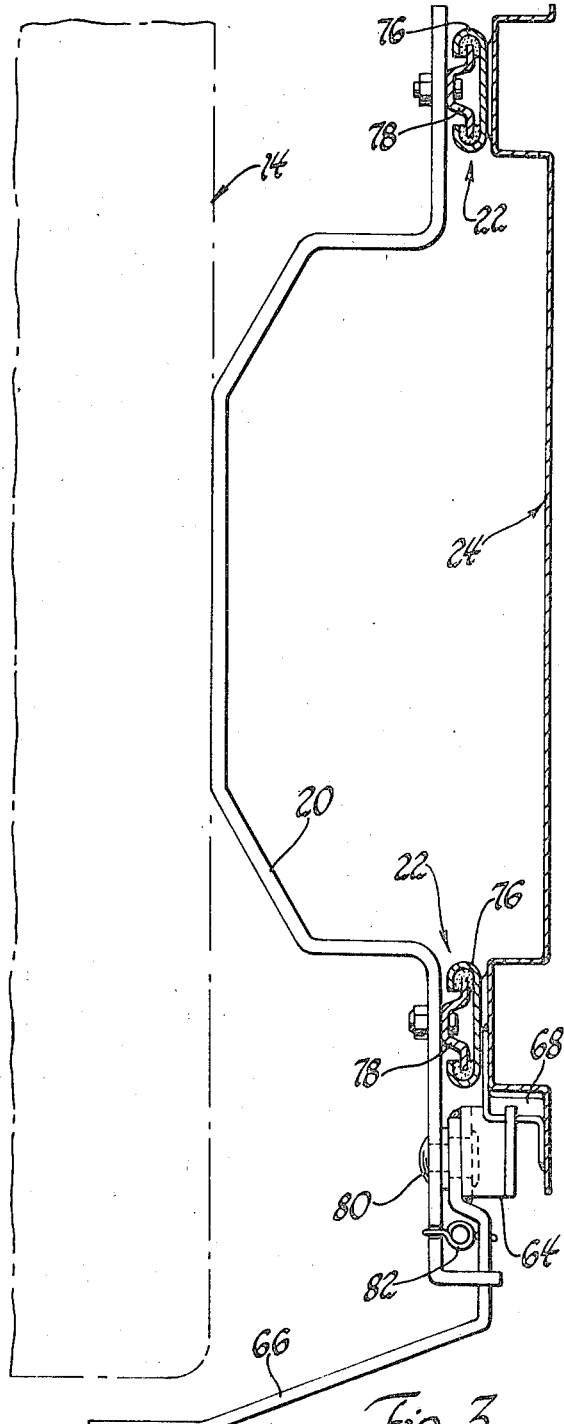
Fig. 2
Fig. 3
INVENTORS
Carl J. Holdampf &
BY Randal J. Murphy
Barnard, McGlynn & Reising
ATTORNEYS INVENTORS
Carl J. Holdampf &
BY Randal J. Murphy
Barnard, McGlynn & Reising
ATTORNEYS

FOLD-UP SEAT

This invention relates to seat assemblies of the type in which a seat portion is pivotally collapsible relative to a backrest portion.

It is often desirable to collapse or fold a seat assembly into a configuration which occupies a minimum amount of space. In an automobile or truck, for example, one might collapse a seat to obtain additional cargo space or to provide access to an interior engine hatch.

The present invention provides a seat assembly particularly usable in automotive vehicles wherein the seat portion is pivotally collapsible relative to a backrest portion to free a substantial portion of the floor space normally occupied by the seat for extra cargo or such other use as may be desired. In general, the present invention comprises a seat assembly having a seat portion and a backrest portion, the backrest portion being vertically displaceable and pivotally connected to the rear of the seat portion, and selectively operable support means at the front of the seat portion which, when rendered inoperable for support purposes, permits the seat to collapse beneath the backrest.

In the preferred form, the invention provides a resilient support for the rear of the seat and the vertically displaceable backrest such that the resilient support provides a unison action spring suspension of both the seat and the backrest when in the occupiable condition.

In a specific form, the backrest is normally freely displaceable in the vertical direction but may be latched in a raised position such that the pivoted seat may collapse beneath the backrest and between the backrest and the floor. Accordingly, the seat and backrest, which are innerconnected for unison action suspension, may normally be placed at a standard and comfortable elevation relative to the floor but when in the collapsed position may fall into a substantially vertical alignment with the backrest against a vehicle wall or bulkhead.

Further features and advantages of the invention will become apparent from a reading of the following specification which describes the embodiment illustrated in the accompanying drawings of which:

FIG. 2 is a side view of the embodiment in the collapsed condition,

FIG. 3 is a view taken along section line 3–3 of FIG. 2, and,

Figure 1:
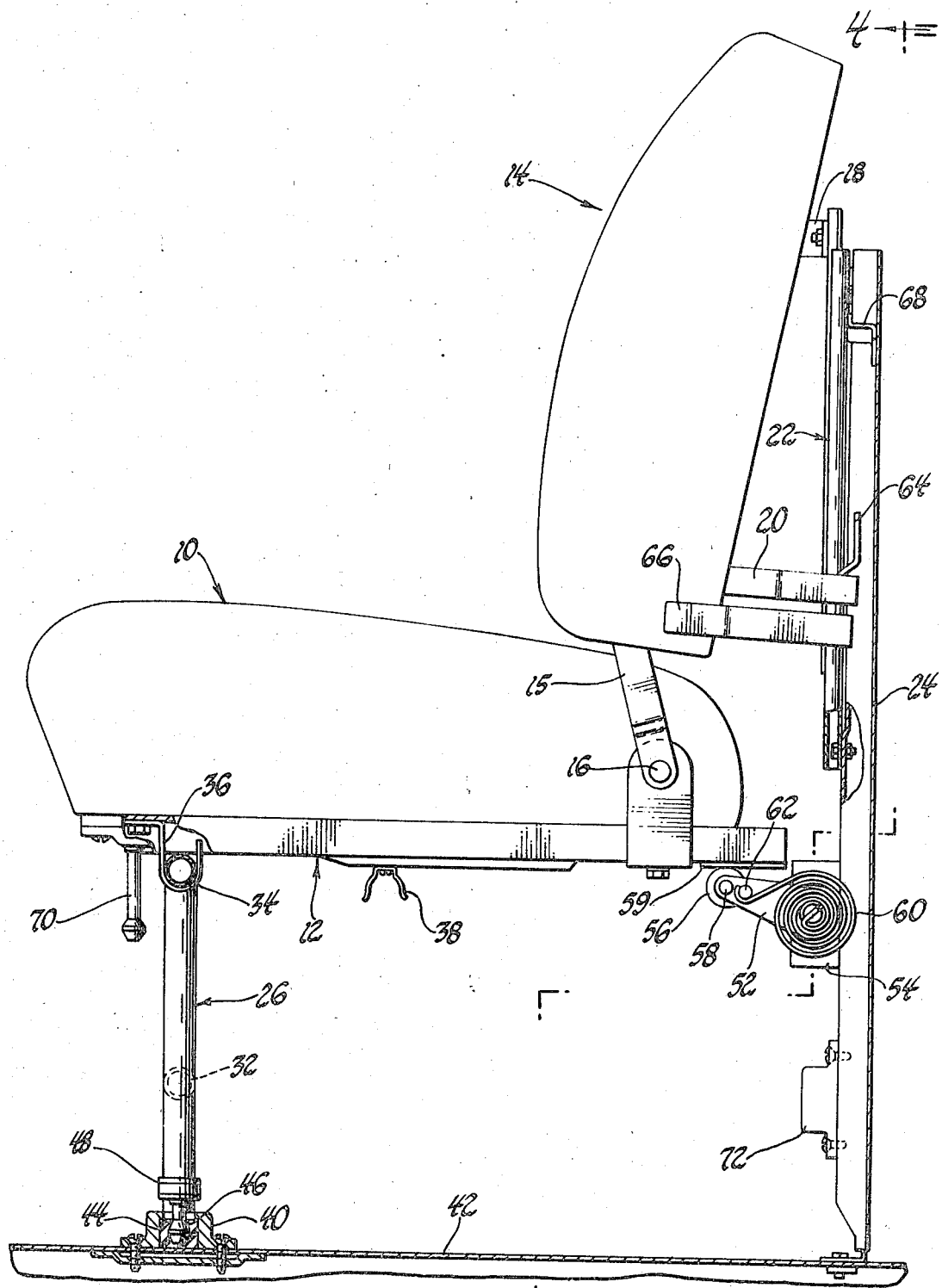
FIG. 1 is a side view of the embodiment in the occupiable condition.

Referring now to FIGS. 1 and 3, the seat assembly embodying the invention is shown in the user occupiable condition. The assembly includes an upholstered spring seat 10 mounted on a rigid frame 12 and an upholstered spring backrest 14 having laterally spaced support brackets 15 which are pivotally connected to the s3at frame 12 at 16. Backrest 14 is provided with upper and lower vertically spaced mounting brackets 18 and 20 which are connected to a vertical seat track assembly 22 to permit the backrest 14 to be displaced in the vertical direction relative to an interior vehicle wall 24. The vertical track assembly 22 will be described in further detail subsequently and with reference to FIG. 3.

For vertical support purposes, the front of the seat frame 12 is provided with a selectively operable support assembly 26 comprising a pair of laterally spaced vertical legs 28 and 30, a lower crossbar 32 extending between the legs and an upper crossbar 34 which extends between and beyond the legs and is pivotally fastened into curved brackets 36 mounted on the frame 12. The bracket 36 permits the cylindrical crossbar 34 to pivot relative to the frame 12 thereby to permit the entire assembly 26 to be collapsed toward the frame 12. When so collapsed, assembly 26 is held in position by means of a spring clip 38 which engages and grasps the center of the crossbar 32.

Figure 4:
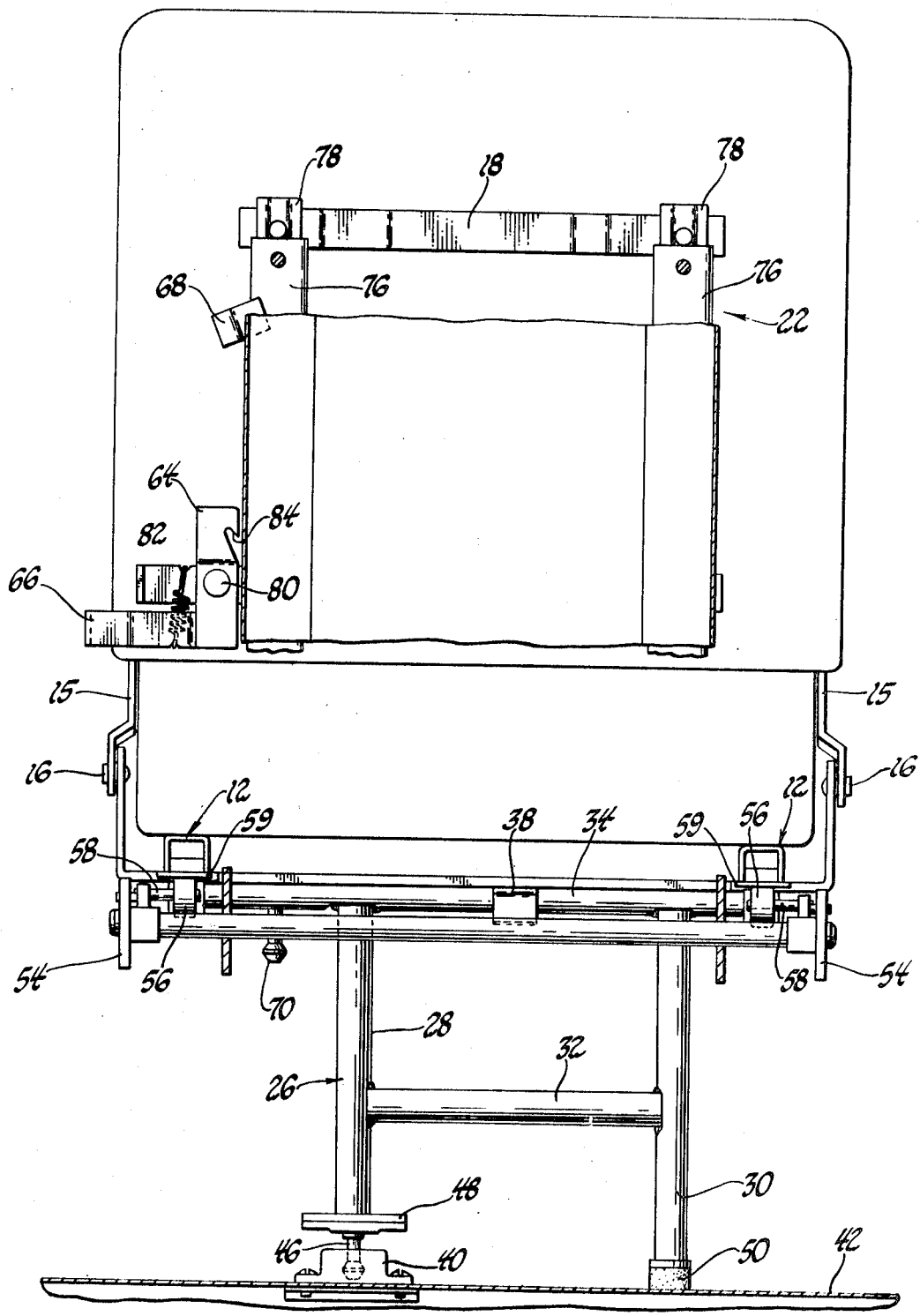
FIG. 4 is a rear view of the embodiment with parts broken away to reveal details.

In the user occupiable position illustrated in FIGS. 1 and 4, the vertical support assembly 26 including the legs 28 and 30 is disposed in the upright or vertical position. Leg 28 is removably connected into a retainer 40 which is mounted on the interior vehicle floor 42. Retainer 40 includes an annular rubber insert 44 which is adapted to receive a plunger 46 mounted on the end of the leg 28 and to retain the plunger therein by interaction with the enlarged head portion thereof. Leg 28 is provided with an enlarged step plate 48 which permits the plunger 46 to be forced into the ring 44 and remove therefrom. Leg 30 is simply provided with a rubber foot 50 which rests on the floor 42.

The rear of the seat frame 12 is vertically supported by resilient support means including a pair of crank arms 52 pivotally mounted in brackets 54 which are in turn mounted on the rear wall 24 in a fixed vertical position. Each of the arms 52 carries at the outer end thereof a roller 56 which is mounted on a pivot shaft 58 and engageable with a flat, horizontal plate 59 mounted on the rear of the frame 12. A heavy spiral spring 60 is secured on one end to the bracket 54 and on the other end around a pin 62 in the arm 52 to bias the arm in the upward or clockwise direction as viewed in FIG. 1. According, the spring force applied to the arms 52 opposes the force of the weight of the occupant of the seat 10 and provides a resilient, unison action suspension for the innerconnected seat 10 and backrest 14.

Summarizing the operation of the seat assembly, thus far described, in the user occupiable condition illustrated in FIGS. 1 and 4 the front support assembly 26 is placed in the vertical position with the plunger 46 properly disposed within the insert 44 of the retainer 40. The rear of the seat frame 12 rests upon the spring biased rollers 56. When an occupant sits on the seat 10 the arms 52 are rotated in the counterclockwise direction against the opposing bias of the springs 60 to an extent determined by the weight of the occupant. The backrest 14 is displaced vertically relative to the wall 24 in unison with the seat 10, this displacement being permitted by the vertical track assembly 22 over the normal range of displacement of the seat 10 and backrest 14. Though the rear of the frame 12 is resiliently supported, the front of the frame 12 is fixed in vertical position such that the crossbar 34 becomes the pivot point for the seat 10 and the frame 12 during vertical displacement of the rear portion thereof.

Looking now to FIG. 2, the seat assembly is illustrated in the collapsed condition wherein the seat 10 is collapsed about the pivot point 16 to lie beneath the backrest 14 and between the backrest and the floor 42. To achieve this condition the plunger 46 on the end of the leg 28 is removed from the rubber insert 44 in the retainer 40 and the support assembly 26 is pivoted within the bracket 36 until the crossbar 32 is snapped into position within the clip 38 directly beneath the seat frame 12. The backrest 14 is then elevated to a raised position which is above the normal range of displacement occasioned during use of the seat by an occupant. The raising of the backrest 14 before collapsing seat 10 about pivot 16 is necessary as the longitudinal length of seat 10 is greater than the distance between point 16 and the floor 42. Backrest 14 is latched into this upper position by means of a latch 64 having a handle 66 which projects forwardly to permit access by the occupant. Latch 64 engages a fixed bracket 68 mounted on the wall 24 as part of the vertical trick assembly 22. When the latch 64 engages the fixed bracket 68 as shown in FIGS. 2 and 3 the backrest 14 is latched in the upper position thereby to permit adequate clearance between the bottom of the backrest 14 and the floor 42 to permit the seat 10 to fully collapse into a vertically aligned condition as shown in FIG. 2. In this condition a plunger 70 mounted on the forward end of the seat frame 12 is urged into a retainer assembly 72 mounted on the wall 24 as part of the vertical track assembly 22. The retainer 72 is substantially identical to the retainer 40 which is mounted on the floor 42 and includes a rubber insert 74 which receives and retains the head of the plunger 70. Both the retainers 40 and 72 permit removal of the associated plungers 46 and 70 by the application of a few pounds of force.

The details of the track assembly 22 and the latch mechanism for the backrest 14 are best shown in FIGS. 3 and 4. In FIG. 3 the track assembly 22 is shown to comprise two conventional seat tracks laterally spaced from one another according to the width of the brackets 18 and 20. Each track assembly 22 comprises a fixed outer track member 76 mounted on the wall 24 and a displaceable inner track member 78 suitably mounted on the brackets 18 and 20 and slidably displaceable within the outer track member 76.

The latch mechanism for the backrest 14 is shown to include a hatch member 64 having a handle 66 and being pivotally connected at 80 to the lower backrest support bracket 20. The latch handle 66 is innerconnected with the lower support bracket 20 by means of a spring 82 which tends to maintain the latch 64 is the closed position as illustrated in FIG. 4. The latch member 64 is shown in FIG. 4 to include a notched portion 84 which engages the outer edge of the fixed bracket 68 which is angularly oriented on the track assembly 22 such that when the backrest is displaced upwardly the latch 64 is pivoted about point 80 until the notched portion 84 snaps over the edge of the bracket 68. To release the latch, the handle 66 is operated against the spring 82 to permit the notched portion 84 to be disengaged from the fixed bracket 68.

With the seat assembly in the collapsed condition of FIG. 2, the backrest 14 is latched in the upper position, the seat 10 is aligned with and vertically beneath the backrest and the plunger 70 is engaged with retainer 72 to prevent the seat from pivoting about point 16. The floor space normally beneath the seat 10 when in the condition of FIG. 1 is, thus, available for cargo or such other use as may be desired.

To reinstate the assembly to the occupiable condition, the plunger 70 is removed from the retainer 72, and the seat 10 is pivoted about point 16. The assembly 26 is lowered into position. The latch handle 66 is pivoted about pivot 80 to release the latch 64 from the bracket 68 and to permit the backrest 14 to be lowered until the plate 59 rests on the suspension rollers 56. Plunger 46 is then forced into retainer 40.

It is to be understood that the foregoing description is illustrative in nature and is not to be construed in a limiting sense.

The embodiments of the invention in which an exclusive property or privilege we claim are defined as follows:

1. A collapsible unison action seat assembly comprising: a seat, selectively operable means for supporting the front of the seat relative to a first support surface; a backrest; means supporting the backrest for vertical displacement relative to a second support surface; the backrest being pivotally connected to the rear of the seat thereby to permit the seat to collapse beneath the backrest when the selectively operable means is rendered inoperable and resilient support means on the second support surface and engageable with the rear of the seat to resiliently support the seat and backrest in the vertical direction.

2. A seat assembly as defined in claim 1 wherein the selectively operable means includes at least one leg pivotally connected to the front of the seat.

3. A seat assembly as defined in claim 2 including means on the seat for retaining the leg in the inoperable position.

4. A seat assembly as defined in claim 1 wherein the resilient support means includes at least one rigid arm pivotally supported on the second surface, a roller on the end of the arm and engageable with the seat, and a spring tending to bias the arm and seat vertically upward.

5. A seat assembly as defined in claim 1 wherein the means supporting the backrest includes latch means for selectively latching the backrest in an upper position.

6. A seat assembly as defined in claim 5 wherein the means supporting the backrest includes a vertical track having a fixed portion on the second support surface and a displaceable portion on the backrest.

7. A seat assembly as defined in claim 1 including means on the second surface for maintaining the seat in the collapsed position beneath the backrest.

8. A collapsible seat assembly comprising: a seat having a frame; at least one leg pivotally connected to the front of the frame for vertical support thereof relative to a floor; a spring biased support arm fixed relative to the floor for resiliently supporting the rear of the frame; a backrest, the lower portion of the backrest being pivotally connected to the rear of the seat frame for unison action displacement therewith under load, vertically slidable track means connecting the backrest to a wall for free vertical displacement thereof between fixed vertical limits, latch means for selectively locking the backrest in a predetermined upper position; the upper position being chosen to permit the seat to pivotally collapse into substantially vertical alignment with the backrest between the backrest and the floor.

9. A seat assembly as defined in claim 8 including means on the wall for retaining the seat in the collapsed position.